(12) United States Patent
Yoskowitz

(10) Patent No.: US 12,066,209 B2
(45) Date of Patent: Aug. 20, 2024

(54) METHOD FOR PRODUCING A DUCTWORK DAMPER, DUCTWORK DAMPER, AND DUCTWORK DAMPER UNIT INCORPORATING SAME

(71) Applicant: Capital Hardware Supply, LLC, Closter, NJ (US)

(72) Inventor: David Yoskowitz, Woodcliff Lake, NJ (US)

(73) Assignee: Capital Hardware Supply, LLC, Closter, NJ (US)

( * ) Notice: Subject to any disclaimer, the term of this patent is extended or adjusted under 35 U.S.C. 154(b) by 781 days.

(21) Appl. No.: 17/258,781

(22) PCT Filed: May 20, 2020

(86) PCT No.: PCT/US2020/033859
§ 371 (c)(1),
(2) Date: Jan. 8, 2021

(87) PCT Pub. No.: WO2020/236970
PCT Pub. Date: Nov. 26, 2020

(65) Prior Publication Data
US 2021/0270493 A1    Sep. 2, 2021

Related U.S. Application Data

(60) Provisional application No. 62/850,020, filed on May 20, 2019.

(51) Int. Cl.
*F24F 13/14* (2006.01)
*B21K 1/24* (2006.01)
*F16K 1/22* (2006.01)

(52) U.S. Cl.
CPC ............... *F24F 13/14* (2013.01); *B21K 1/24* (2013.01); *F16K 1/22* (2013.01); *F24F 13/1406* (2013.01); *F24F 13/1486* (2013.01)

(58) Field of Classification Search
CPC .... F24F 13/14; F24F 13/1406; F24F 13/1486; B21K 1/24; F16K 1/22; F16K 1/222
(Continued)

(56) References Cited

U.S. PATENT DOCUMENTS 3,007,673 A    11/1961    Paxton et al.
4,146,048 A     3/1979    McCabe
(Continued)

FOREIGN PATENT DOCUMENTS

CN    203584247 U    5/2014
EP        424197 A1    4/1991
(Continued)

OTHER PUBLICATIONS

International Search Report, dated Sep. 3, 2020 for corresponding PCT patent application No. PCT/US2020/033859.

*Primary Examiner* — Steven B McAllister
*Assistant Examiner* — William C Weinert
(74) *Attorney, Agent, or Firm* — Amster, Rothstein & Ebenstein LLP

(57) ABSTRACT

A method for producing an air duct damper includes the steps of punching from sheet metal stock a damper preform having a body and two diametrically opposed arms extending from opposite sides of the body; and forming an indentation in the damper preform extending between and up to respective ends of the two arms.

14 Claims, 8 Drawing Sheets

(58) Field of Classification Search
USPC .......................................................... 454/284
See application file for complete search history.

(56) References Cited

U.S. PATENT DOCUMENTS

| 4,625,632 | A | 12/1986 | Markman et al. | |
|---|---|---|---|---|
| 2004/0031945 | A1 | 2/2004 | Krimmer | |
| 2005/0184268 | A1 | 8/2005 | Narayanaswamy | |
| 2010/0197217 | A1* | 8/2010 | Yoskowitz | F24F 13/14 |
| | | | | 454/317 |

FOREIGN PATENT DOCUMENTS

| GB | 955502 | A | | 4/1964 | | |
|---|---|---|---|---|---|---|
| KR | 101663127 | B1 | * | 10/2015 | | |
| KR | 200479287 | Y1 | | 1/2016 | | |
| KR | 2017128853 | A | | 11/2017 | | |
| KR | 20210021744 | A | * | 8/2019 | | |
| NO | 180408 | B | * | 1/1997 | ............. | A62C 2/14 |
| PL | 225397 | B1 | * | 4/2017 | | |
| WO | WO-2013036711 | A1 | * | 3/2013 | ............. | F16J 15/061 |

\* cited by examiner

METHOD FOR PRODUCING A DUCTWORK DAMPER, DUCTWORK DAMPER, AND DUCTWORK DAMPER UNIT INCORPORATING SAME

CROSS REFERENCE TO RELATED APPLICATIONS

This application is a national phase of PCT application No. PCT/US2020/033859, filed May 20, 2020, which claims priority to U.S. provisional patent application No. 62/3850,020, filed May 20, 2019, all of which are incorporated herein by reference hereto.

FIELD OF THE INVENTION

The present invention relates to improved dampers for pivotal mounting in cooling and heating ductwork.

BACKGROUND OF THE INVENTION

Conventional heating, ventilating and air-conditioning (HVAC) systems utilize vast lengths of sheet metal duct work to convey conditioned air throughout buildings of all types, including residential, industrial, office, medical and apartment buildings. Such HVAC systems include a great many pivotable damper blades situated in air ducts at selected locations to facilitate adjustments at the air flow as required.

In many conventional circular tube HVAC duct systems, each damper is a circular disk pivotably mounted via bearing elements mounted on the side and extending through a set of aligned holes cut in opposite facing side walls of duct segments. Typically, two bearing elements are mounted on opposite peripheral edge regions of the disk. These pivot elements allow the damper blade to pivot from a closed position in which it substantially blocks the air flow to an angled position in which it permits different degrees of airflow.

Known air duct dampers have numerous components and/or are complicated to produce. The present invention seeks to significantly reduce the number of components in a damper blade and to reduce the cost of manufacture by more efficient use of material to produce the damper plates.

SUMMARY OF THE INVENTION

According to one aspect of the invention, a method for producing an air duct damper includes stamping from sheet metal stock a damper preform having a body and two diametrically opposed arms extending from opposite sides of the body; and forming an indentation in the damper preform, extending between and up to respective ends of the two arms.

The indentation extending between the ends of the arms provides rigidity to the damper plate and the arms. At the same time, the arms of the damper function as pivots that can be received in correspondingly shaped openings of bushings that are pivotally mounted on opposite side walls of a ductwork section.

The indentation can have different cross-sectional shapes. In one embodiment, the indentation has a substantially v-shaped cross section. In this case the arms have a v-shaped cross section and can be received in bushings with a corresponding v-shaped through opening.

According to another advantageous embodiment, the indentation has a c-shaped or semicircular cross section. In a particularly advantageous variant, the ends of the c-arms with the c-shaped or semicircular cross section can be provided with external threads. In this way, the arms can be secured in the corresponding through-openings of the bushings by threadably engaging a nut with corresponding internal threads on the external threads of the arms.

In an embodiment, the c-shaped or semicircular cross section of the arms can also be achieved by first forming the preform with an indentation having a v-shaped cross section and then forming the arms so as to have a c-shaped or semicircular cross section.

In another embodiment, the indentation can be formed simultaneous with the stamping of the preform.

According to another aspect of the invention, a bushing for pivotally mounting a damper to a section of ductwork for directing conditioned air in a predetermined direction, includes a member made of a soft pliable material, and having a generally circular outer periphery, the member defining a peripheral groove over at least a portion of the periphery for attachment of the member to a section of the ductwork by insertion into an opening in the ductwork, the opening preferably being of diameter at least equal to, or generally less than the inner diameter of the peripheral groove.

A generally central opening extends through the center of the soft pliable member for engaged reception of a pivot arm of the damper, for permitting the damper to be pivoted relative to the ductwork while the bushing rotates smoothly relative to the ductwork.

The bushing can be made of a natural or synthetic rubber material, although such materials are not considered to be limited. Silicone rubber or any synthetic rubber material is preferred.

The generally central opening in the bushing member is preferably tapered, with the opening of lesser dimension on one side being less than the corresponding dimension of the pivot arm of the damper plate, to thereby provide an airtight seal therebetween when the pivot arm is inserted into the opening.

The tapered opening in the bushing is such that one side is dimensioned to snugly receive the pivot arm, and the opposite side is of slightly less dimension than the pivot arm. Upon assembly, when the pivot arm is inserted into the opening (i.e., preferably through the larger end for ease of insertion) a small outward force will be applied by the pivot arm to the body of the bushing member when it reaches the smaller end of the tapered opening in the bushing member. This force will cause the bushing material to expand radially outwardly thus increasing the already tight fit between the periphery of the bushing and the ductwork, thereby improving the seal therebetween.

Preferably, the bushing for pivotally mounting a damper to a section of thin sheet metal ductwork comprises a member made of a soft pliable silicone rubber material, and defining a generally longitudinal axis, the member having a first section of generally circular configuration, preferably monolithically formed with a second section of similar generally circular configuration, the first section having an outer diameter greater than the diameter of the second section to define a radially extending generally annular surface of the first section extending circumferentially around the second section. It is foreseeable that the first section can be of shape other than circular without departing from the invention. For example, the first section can be square while still functioning to retain the bushing member in position in the ductwork.

At least two diametrically opposed lips (or "ears') extend radially outwardly from the second section and adjacent the first section, each such lip being longitudinally spaced from the annular surface of the first section. However, it should be appreciated that these lips (or "ears') are provided in the preferred embodiment, and that an embodiment which does not include such lips can function without departing from the invention. In such case the groove will perform most of the retention function, and therefore, can optionally be made deeper than in the embodiment with the lips.

A groove extends about the periphery of the second section adjacent the annular surface of the first section, the thickness of the groove in the longitudinal direction being approximately equal in dimension to the thickness of the ductwork sheet metal, and the inner diameter of the groove being equal to, or preferably slightly greater than a corresponding dimension of the aperture in the ductwork intended for insertion of the bushing member, for resilient engaged reception of the bushing member therein, whereby the bushing member may be securely attached to the ductwork by reception of the ductwork in the groove and by retention of the ductwork between the annular surface of the first section and each radially upstanding lip of the second section. As will be explained hereinbelow, the thickness of the groove in the bushing can be somewhat greater than the thickness of the ductwork sheet metal. In such case, it is preferable that the diameter of the groove provides a tight fit between the bushing member and the ductwork.

It is envisioned that the bushing of the present invention can be of two-piece construction, each piece being dimensioned and configured to be assembled with the other piece to appear and function as a one-piece bushing.

Improved ductwork is also disclosed for directing conditioned air in a predetermined direction, which comprises a damper according to the present invention rotatably mounted in the ductwork on bushings constructed according to the present invention, whereby loss of conditioned air between the pivot arms of the damper and the bushing is eliminated due to the unique bushings on which the damper is pivotally mounted.

As noted, the bushing of the present invention is preferably made of a soft pliable flexible and resilient material, such as natural or synthetic rubber. Silicone rubber is preferred, due particularly to its physical characteristics, as well as its capability to be formed and dimensioned within predetermined units. Silicone rubber is a rubber-like material composed of silicone itself a polymer-containing silicon together with carbon, hydrogen, and oxygen. Silicone rubbers are elastomers comprised of either one- or two-part polymers, and may contain fillers to improve properties or reduce cost. Silicone rubber is generally non-reactive, stable, and resistant to extreme environments and temperatures from minus 55° C. (i.e., −55° C.) to plus 300° C. (i.e., +300° C.), while still maintaining its useful properties.

There are also many special grades and forms of silicone rubber, including: Steam resistant, metal detectable, high tear strength, extreme high temperature, extreme low temperature, electrically conductive, chemical/oil/acid/gas resistant, low Smoke emitting, and flame-retardant. A variety of fillers can be used in silicone rubber, although most are non-reinforcing and lower the tensile strength.

The silicone rubber contemplated by the present invention may be of hardness in a range of hardness levels, expressed as Shore A or IRHD, between 10 and 100, the higher number being the harder compound. It is also available in virtually any color and can be color matched.

BRIEF DESCRIPTION OF THE DRAWINGS

The above and other advantages of the invention will be further described and appreciated by those skilled in the art by reference to the following detailed description of the invention, the claims and the appended drawings in which:

DETAILED DESCRIPTION OF PREFERRED EMBODIMENTS

Figure 1:
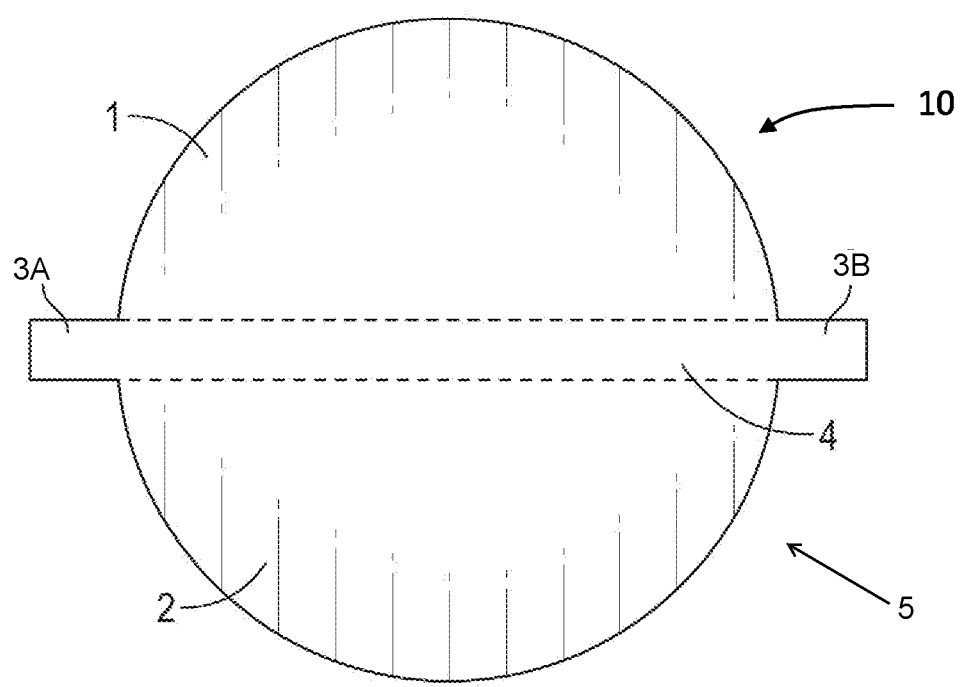
FIG. 1 shows a schematic illustration of an embodiment of a damper preform produced by the method according to the present invention.
Figure 2:
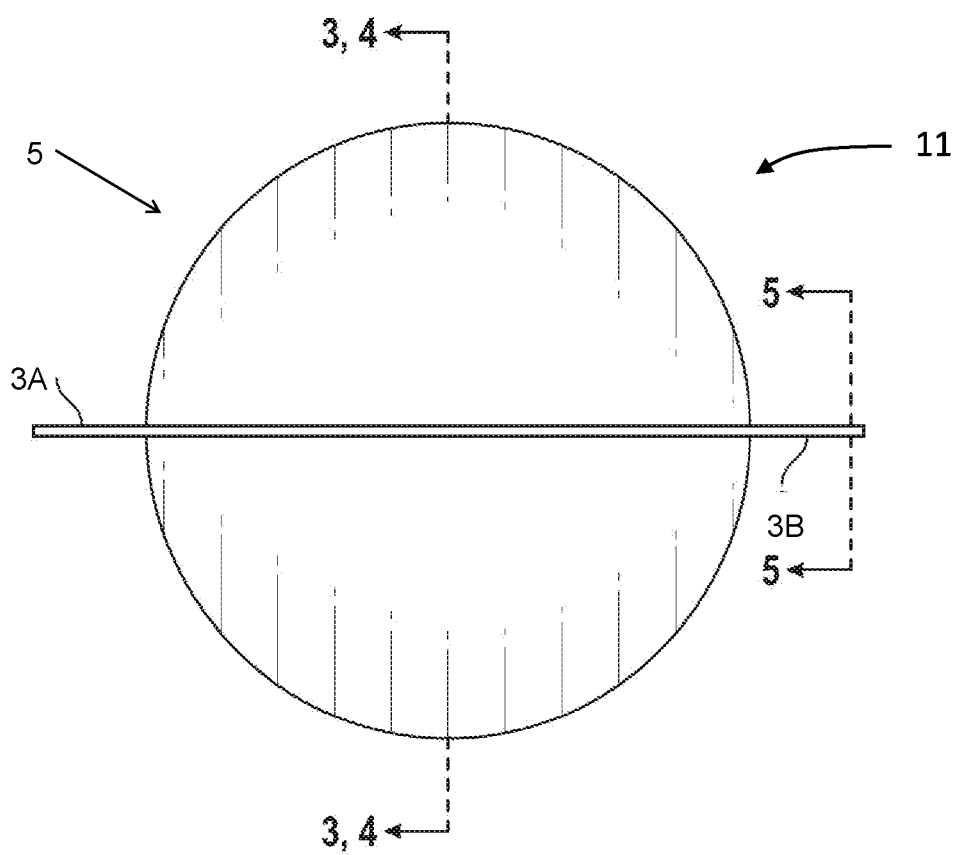
FIG. 2 shows the embodiment of FIG. 1 after formation of the indentation.
Figure 4:
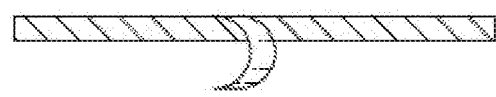
FIG. 4. shows the embodiment of FIG. 2 in a view taken along the direction indicated by the arrows 5-5 after the additional step of forming the arms so as to have a c-shaped cross section.

FIGS. 1 and 2 schematically illustrate the steps of an embodiment of the process for producing a damper 11 according to the present invention. FIG. 1 shows a preform 10 of the damper 11 that was stamped from sheet metal stock. The preform 10 has a body 5 and two diametrically opposed arms 3A and 3B (collectively arms 3) extending radially from the body 5 from opposite sides of the body 5. In the embodiment shown in FIG. 1, the body 5 comprises two substantially semi-circular portions 1, 2 and a central portion 4 between the two substantially semicircular portions 1, 2.

The preform 10 produced in the stamping step is subjected to a forming step in which an indentation is formed in the preform 10 that extends substantially centrally along the central portion 4 from the end 3a of one of the arms to the end 3b of the other arm. As a result of the indentation, the two substantially semicircular portions 1, 2 are positioned closer to each other and together define a substantially circular shape.

Figure 3:
FIG. 3 shows the damper plate of FIG. 2 in a view taken along the direction indicated by arrow 5-5.

The indentation formed in the preform 10 can have different cross-sectional shapes. FIG. 3 shows a view of the damper 11 of FIG. 1 in which the cross section of the indentation is v-shaped. The opposing arms 3 also have a v-shaped cross section and can be received in corresponding v-shaped through-openings of bushings mounted on opposing sides of the ductwork to pivotally mount the damper plate in the ductwork.

In another embodiment, the cross-sectional shape of the arms can be modified after the stamping step. For example, in a further forming step, the arms can be formed so as to have a c-shaped cross section. This makes it possible to provide external threads on the ends of the arms to secure the damper plate in corresponding c-shaped through-openings of bushings by engaging a nut with corresponding internal threads on the threaded c-shaped ends of the damper plate.

Figure 5A:
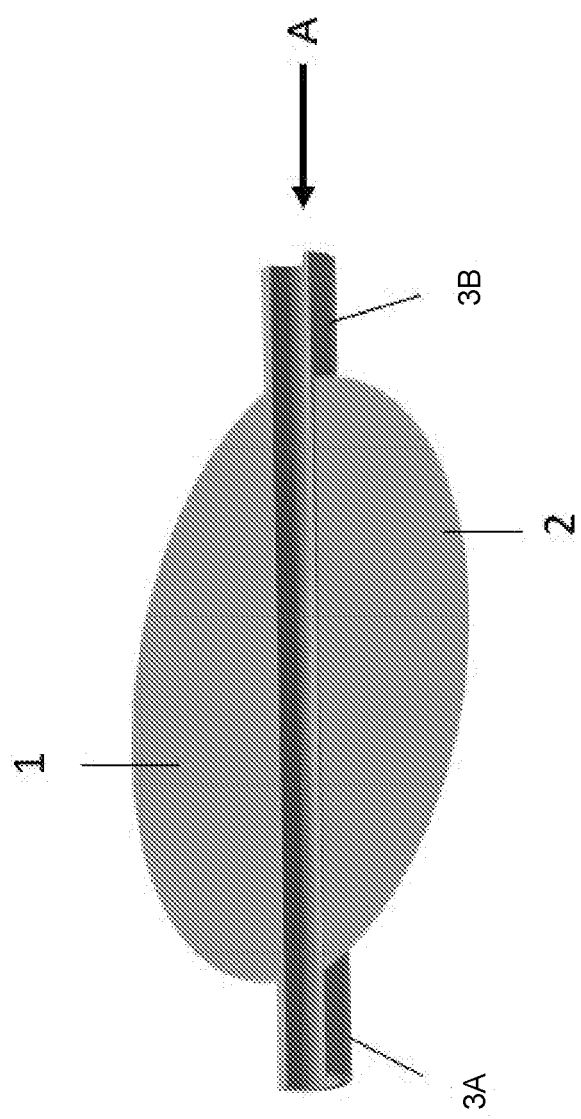
FIG. 5A. shows a perspective to view of an embodiment of the damper, with the indentation having a c-shaped cross-section.
Figure 5B:
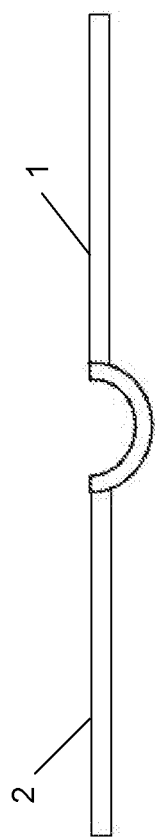
FIG. 5B shows the damper plate of FIG. 5A in a view taken along the direction indicated by arrow A.

In a particularly advantageous embodiment, the indentation formed in the preform has a c-shaped or semicircular cross section. This embodiment is shown in FIGS. 5A and 5B. In this embodiment, the step of forming the indentation results in arms 3 that already have a c-shaped cross section.

Figure 6:
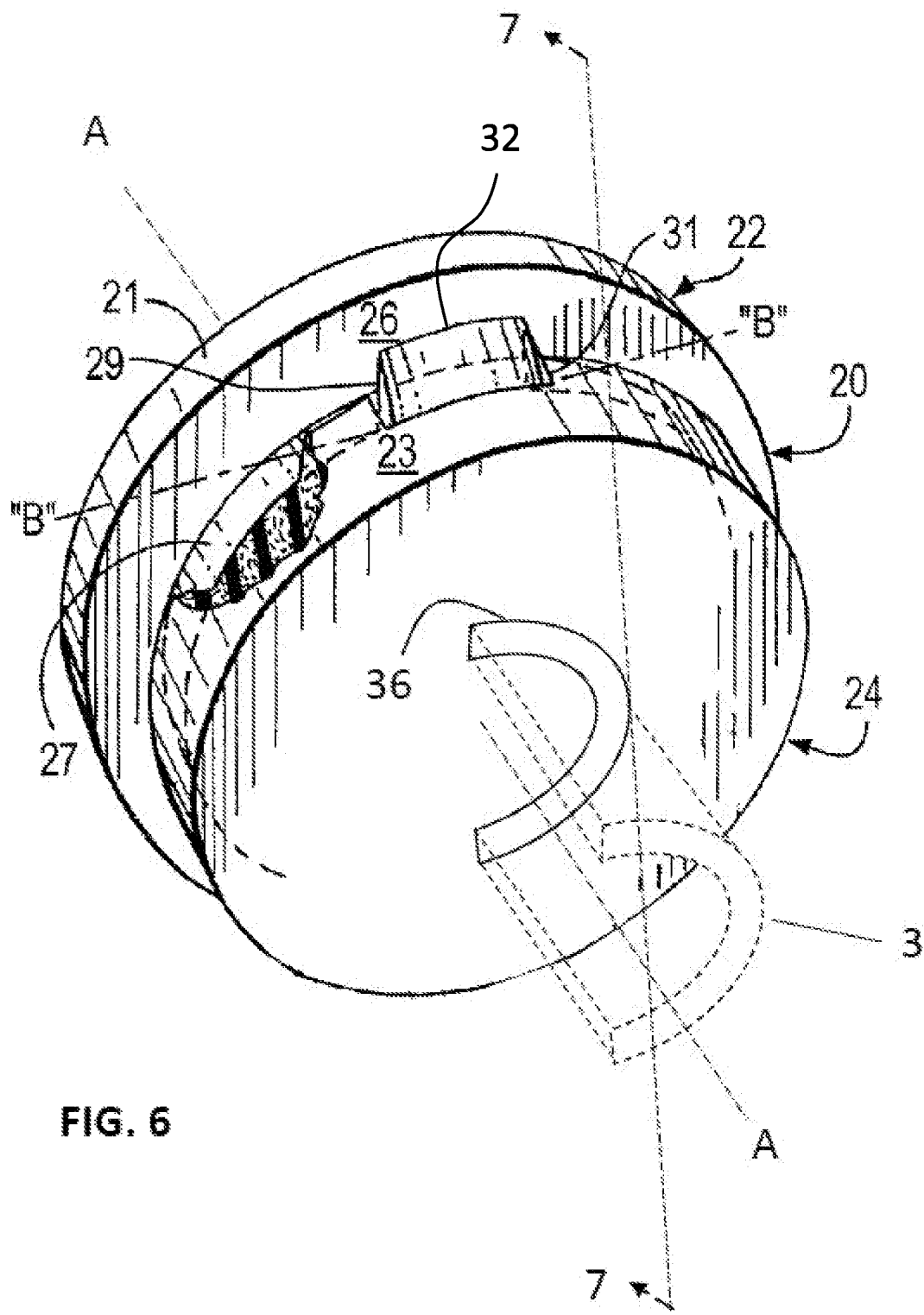
FIG. 6 shows an enlarged front, left side and top perspective view of a soft and pliable bushing constructed as shown, according to the present invention.
Figure 7:
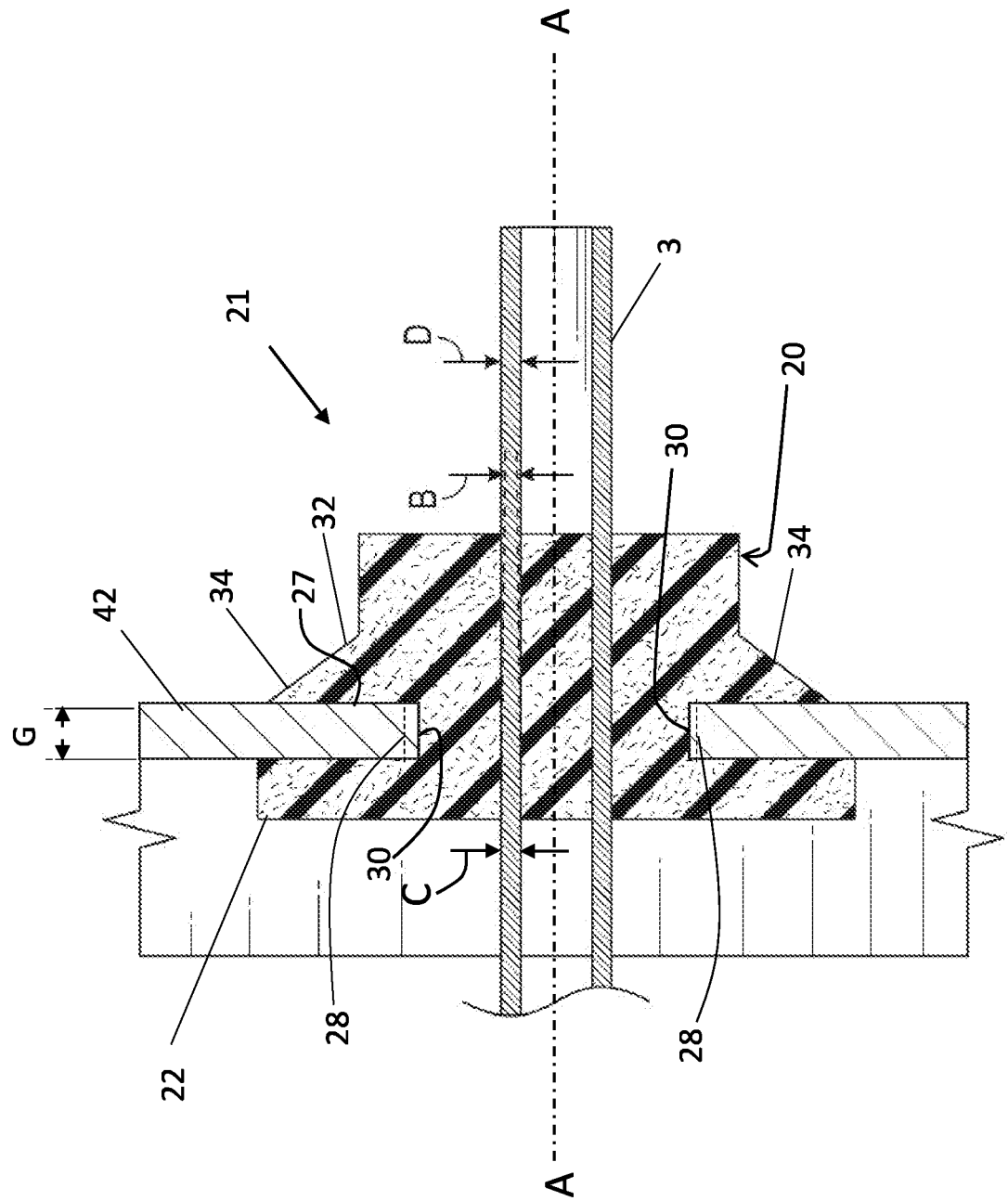
FIG. 7 is an enlarged cross-sectional view of the bushing of FIG. 3, taken along lines 7-7 of FIG. 6, inserted into a section of ductwork from the inside of the ductwork, and pivotally mounting a rotatable damper to the ductwork via integral arms of the damper.

As shown in FIGS. 6-8 the damper 11 is in turn, mounted on bushings constructed according to the present invention.

Referring to FIGS. 6 and 7, a bushing 20 constructed according to the present invention is shown. In FIG. 7, the bushing is installed in a section 42 of sheet metal ductwork. As shown in the preferred embodiment, the bushing 20 is made of a soft silicone rubber material which is not only pliable, but which also provides a significant degree of lubricity, a feature unique to silicone rubber, which feature permits the bushing to pivotally rotate with ease when such pivotal rotation of the damper is necessary. In one respect the bushing functions somewhat like a bearing when pivotally rotated.

In FIGS. 6 and 7, the bushing 20 of the present invention includes a circular shaped member 20 made of silicone rubber material, the member 20 having a first section 22 of a first diameter, and a second section 24 of lesser diameter, preferably monolithically molded with the first section 22. As can be seen, first section 22 has an outer circumferential and peripheral surface 21 of diameter which is greater than the outer circumferential and peripheral surface 23 of the second section 24 to form annular surface 26 extending radially outward from the second section 24.

A peripheral groove 27 extends about the entire periphery of the second section 24 between first section 22 and the second section 24 as shown. This groove 27 receives and interfaces with the sheet metal ductwork 42 as shown in FIG. 7, to provide an airtight seal between the bushing 20 and the ductwork 42. As can be seen further, the bushing 20 is retained in the ductwork 42 in a circular aperture 30, the diameter of which is preferably slightly less than the inner diameter 15 of peripheral groove 27. The thickness of such sheet metal ductwork is generally about 0.012 and 0.095 inch. Depending upon the application, other thicknesses greater or lesser, can be used.

In the FIGS., the inner diameter of peripheral groove 27 appears to match the diameter of aperture 30 in ductwork 42, a condition which is acceptable. However, in the preferred embodiment, the diameter of aperture 30 formed in the ductwork 42, is preferably slightly less than the initial inner diameter 28 of the peripheral groove 27 (indicated by dash line 28 in FIG. 7) to provide a predetermined amount of compression of the bushing material, which in turn provides even an improved airtight seal. In FIG. 7, phantom lines 28 show the original uncompressed inner surface of groove 27, prior to insertion of the bushing into aperture 30. For example, should the diameter of aperture 30 in ductwork 42 be about 0.610 inch, then the uncompressed inner diameter 15 of peripheral groove 27 in bushing 20 can be approximately 0.625 (i.e., ⅝) inch. Thus, the diameter of aperture 30 in the ductwork is about 2% to 3% less than the uncompressed diameter of peripheral groove 27 in bushing 20. Such relative dimensions can be altered, depending upon the seal desired. If desired, both diameters can be made equal.

Referring again to FIGS. 6 and 7, bushing 20 also includes diametrically opposed radially extending lips (or "ears") 32, 34 which conveniently assist groove 27 in permanently retaining the bushing 20 in the aperture 30. Lips 32,34 are attached to, or otherwise extend radially outwardly from the second section 24 for resilient pivot-like movement about axis B-B (shown in FIG. 6) axis which is perpendicular to the longitudinal axis of the bushing 20. Such resilient pivotal movement of lips 32, 34 is provided by longitudinal cuts 29. 31, and facilitates one-way insertion into aperture 30 of ductwork 42 to permit entry thereof through the aperture until the ductwork 42 enters groove 27, and corresponding resilient return of lips 32, 34 to the engaging positions shown in FIG. 7. Lips 32, 34 are spaced from annular surface 26 by distance "G", which is approximately equal to the thickness of the sheet metal duct work and the groove 27. As noted, the invention can be practiced without the lips (or "ears') 32, 34. In such case the groove may be made deeper to retain the bushing in place within the ductwork between the groove and the annular radial surface. In any event, the lips (or "ears') 32, 34 are preferred.

In FIGS. 6 and 7, bushing 20 also defines a central longitudinal axis A-A which extends through central aperture 36, through which correspondingly shaped and dimensioned pivot arm 3 extends. Although two spaced apart lips 32, 34 are shown separate and apart from each other, a person of ordinary skill in the art will appreciate that a continuous lip can circumscribe the groove 27. Still, alternatively a greater plurality of such lips can be positioned about the circumference of the second section 24 spaced from each other by a predetermined number of degrees.

Referring again to FIGS. 6 and 7, the central aperture 36 of bushing 20 is conveniently tapered, with dimension "D" of pivot arm 3 being greater than the initial (i.e., pre insertion) dimension "B" of opening 36 of bushing 20. Dimension "B" is preferably less than the corresponding dimension "D" of the pivot arm 3 to ensure a tight seal between the bushing 20 and the pivot arm 3. The tight fit between the bushing 20 and the pivot arm 3 extends entirely about the pivot arm.

In FIG. 7, the initial configuration of through-opening 36 is shown as being tapered, i.e., from initial greater dimension "C' of the inner side of the bushing 20 to smaller dimension "B" on the outer side of bushing 20. After insertion of damper pivot arm 3, the opening 36 substantially conforms to the outer surface and dimensions of the pivot arm 3 as shown in the FIG.

As noted, the initial taper of opening 36 facilitates convenience of assembly with the damper pivot arm 38, while assuring a tight fit between the pivot arm 3 and at least the opening of dimension "B". For example, the pivot arm 3 can be inserted into the inner side of opening 36 of greater dimension "C", ultimately to reach the outer side opening of dimension "B" of lesser dimension, to form a tight seal with the pivot arm 3.

It can be readily appreciated that the snug fit between bushing 20 and ductwork section 42, and between bushing 20 and pivot rod 3, both ensure a significantly improved airtight seal therebetween, while permitting pivotal rotation of the pivot rod 3, as facilitated by the relatively low friction surface of the silicone rubber and the bearing support provided by the bushing member 20.

It should also be appreciated that while silicone rubber is the preferred material for fabricating the bushing, any soft and pliable material may be used, such as synthetic or natural rubber, or other known elastomers.

Figure 8B:
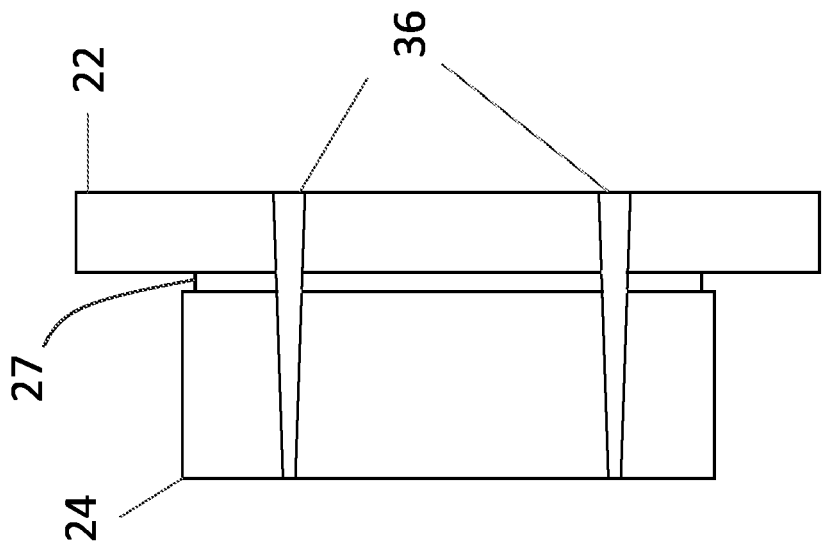
FIG. 8B Is a cross sectional view of the embodiment of FIG. 8A taken along lines 8B-8B.
Figure 8A:
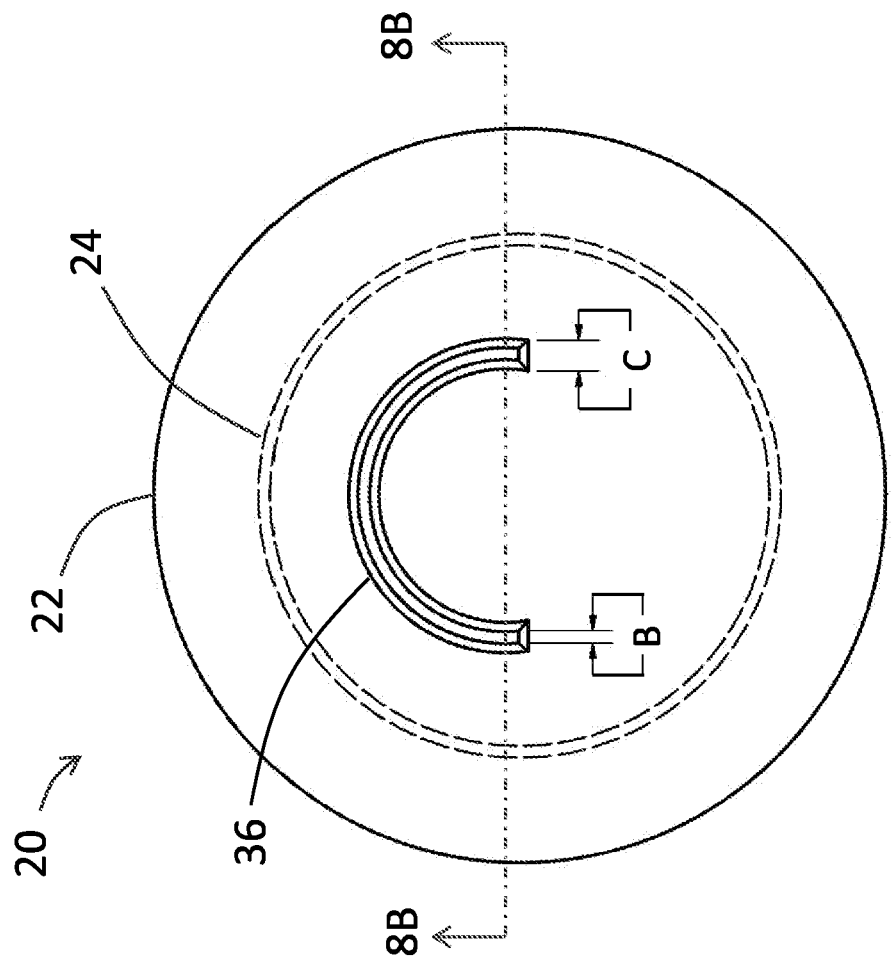
FIG. 8A is a front plan view of another embodiment of the bushing according to the present invention.

FIGS. 8A-B show another embodiment of the bushing according to the invention. As in the embodiment of FIGS. 6-7, the through-opening 36 is C-shaped and tapered along its longitudinal extent with a dimension B of the through opening on an end of the bushing facing inward with respect to the section of ductwork being smaller than a dimension C of the through opening on the outward facing end of the bushing. In another embodiment, the though opening can be tapered in opposite direction, i.e., the smaller dimension of the through opening is on the outward facing end of the bushing and the greater dimension on the inward facing end of the bushing. A difference of the embodiment shown in FIGS. 8A-B to the embodiment of FIGS. 6-7 is that no retaining lip is provided on the section 22.

Figure 9:
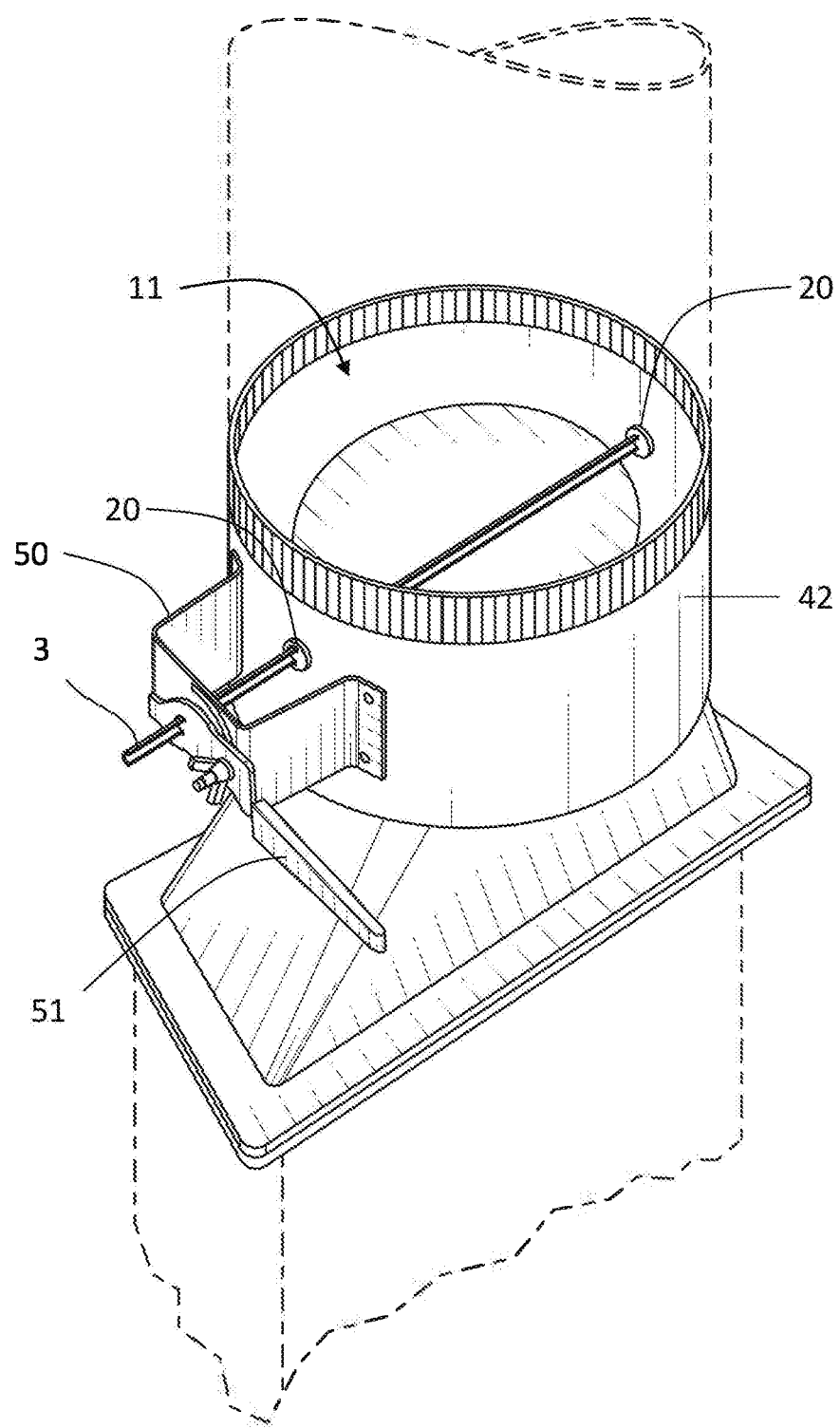
FIG. 9 is a front, right side and top perspective view, of a section of ductwork showing a typical installation of an embodiment of a damper constructed according to the present invention mounted on bushings constructed according to the present invention.

FIG. 9 illustrates a section of ductwork 42 having an embodiment of a damper 11 according to the present invention mounted on bushings 20 according to the present invention. In this embodiment the arms 3 of the damper 11 have a c-shaped cross section and are received in c-shaped through-openings in bushings 20. Standoff plate 50 is mounted on the outside of the ductwork 42. Handle 51 is mounted on standoff plate 51 and engages arm 3 of the damper for pivoting the damper blade by rotating the handle 51.

Figure 10A:
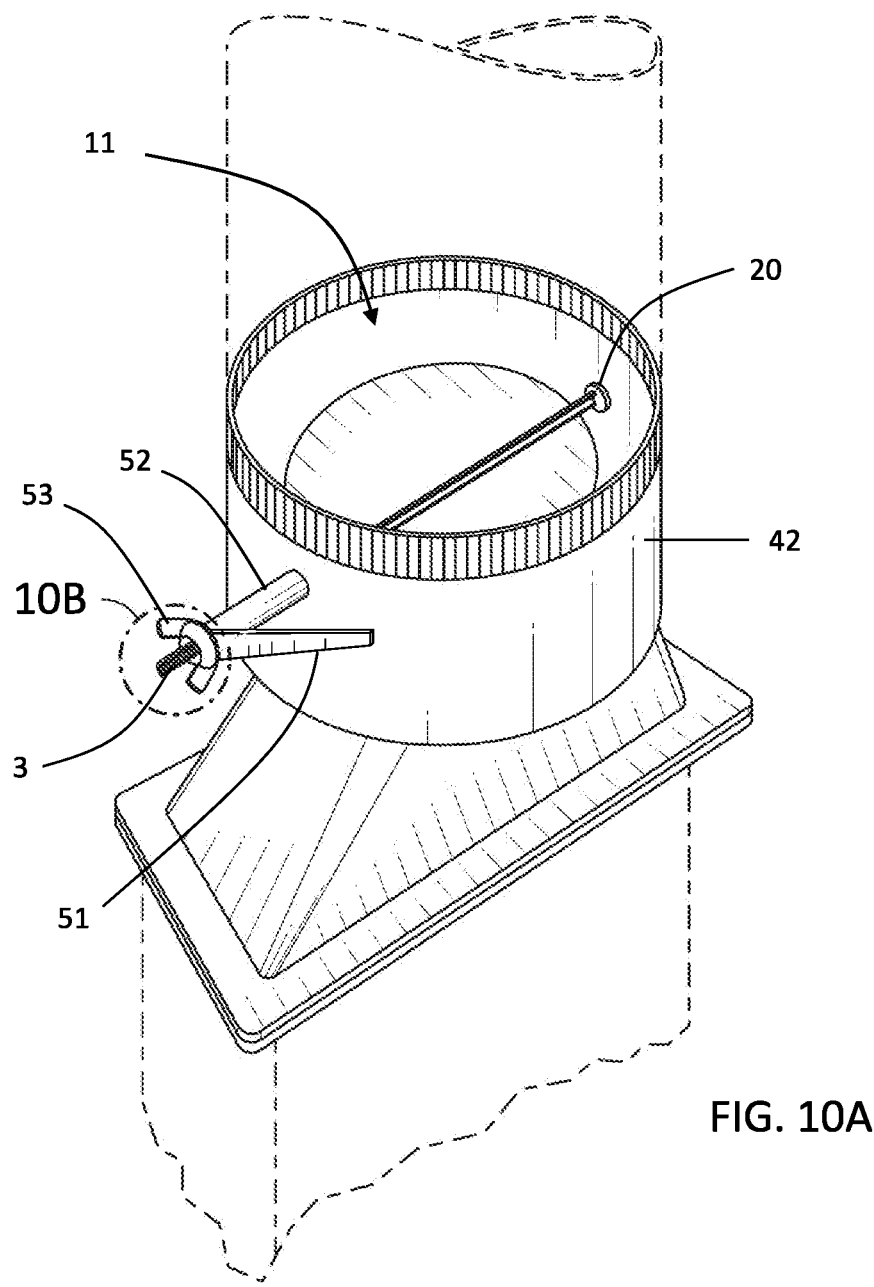
FIG. 10A is a front, right side and top perspective view, of a section of ductwork showing a typical installation of an embodiment of a damper constructed according to the present invention mounted on bushings constructed according to the present invention
Figure 10B:
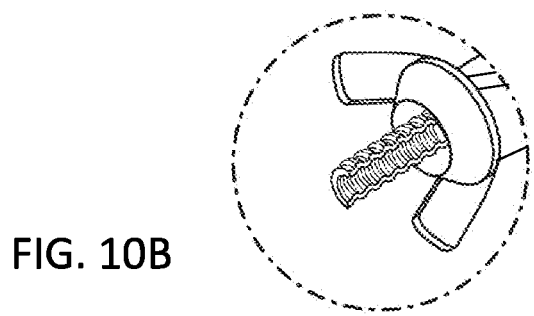
FIG. 10B is an enlarged view of the encircled portion of FIG. 10A.

FIGS. 10A-B show another embodiment of the damper unit according to the invention. In this embodiment, a cylinder 52 is received on arm 3 of the damper 11. A wing nut 53 is engaged on the external threading of the arm 3 and tightened so as to urge the cylinder 52 against the metal fitting of the ductwork 42, thereby securing the damper blade of the damper 11 in place. Any of the embodiments of the bushings disclosed in this application can be combined with any embodiment of the damper plates and any embodiment of the ductwork.

While the present invention is contemplated for use with conventional ductwork made of thin galvanized sheet metal, of thickness between 0.012 and 0.60 inches, and having a generally tubular configuration of circular cross-section, it may be used with alternative ductwork materials such as plastics, fiberglass, flexible ducting or the like. In addition, the ductwork can be of alternative designs such as ductwork having a rectangular or square cross-section. In such installations the structure which incorporates the damper would necessarily be structured and arranged to facilitate installation of the damper of the present invention and the damper configuration will be arranged to match the ductwork.

The invention claimed is:

1. A method for producing an air duct damper, comprising:

stamping, from a sheet of sheet metal stock, a planar, unibody damper preform having a central body and two integral diametrically-opposed arms extending radially from opposite sides of the central body; and forming an indentation in the planar, unibody damper preform, the indentation extending longitudinally along an entirety of each of the two integral diametrically-opposed arms and the central body therebetween, wherein forming the indentation causes the two diametrically-opposed arms and the central body to be displaced outwardly from a plane of the planar, unibody damper preform.

2. The method of claim 1, further comprising forming the two integral diametrically-opposed arms so that each one of the two integral diametrically-opposed arms has a c-shaped cross section, and providing an external threading on each one of the two integral diametrically-opposed arms for engagement with an internal threading in a nut.

3. The method of claim 1, wherein the indentation has a v-shaped cross section.

4. The method of claim 1, wherein the indentation has a substantially c-shaped or semicircular cross section.

5. The method of claim 1, wherein the step of stamping the sheet from the sheet metal stock and the step of forming of forming the indentation are performed simultaneously.

6. A damper unit for pivotal attachment to a section of sheet metal ductwork for selectively directing conditioned air in a predetermined direction, which comprises:

a) a damper plate produced by the method of claim 1; and b) a pair of bushings, each of which configured for pivotally mounting a corresponding one said two integral diametrically-opposed arms to the section of ductwork, each of said pair of bushings including:

i) a member made of a pliable silicone rubber material, and generally defining a longitudinal axis, said member having a first section of generally circular configuration monolithically formed with a second section of similar generally circular configuration, said first section having a first diameter greater than a second diameter of said second section to define an annular surface extending radially and about a periphery of said second section;

ii) at least two diametrically opposed lips extending radially outwardly from said second section and adjacent to said first section, each one of said at least two diametrically opposed lips being longitudinally spaced from said annular surface of said first section and resiliently pivotable about an axis perpendicular to said longitudinal axis;

iii) a groove which extends over the periphery of said second section adjacent said annular surface of said first section, a thickness of said groove in a longitudinal direction with respect to the longitudinal axis being sized and dimensioned to receive a thickness of sheet metal forming the ductwork, and an inner diameter of said groove being at least equal to or greater than a corresponding dimension of an aperture in the ductwork for resilient engaged reception of said member therein, wherein said member is securely attached to the ductwork by insertion of the member into the aperture in the ductwork, and reception of the ductwork into said groove, wherein the ductwork is retained between said annular surface of said first section and said groove, and each said at least two diametrically opposed lips of said second section; and iv) a tapered through-opening extending generally centrally and longitudinally through said member, said tapered through-opening being dimensioned for slidable engaged reception with a corresponding one of said two integral diametrically-opposed arms, said tapered through-opening having a cross-sectional shape similar to a cross-sectional shape located at a pivot point of the corresponding one of the two integral diametrically-opposed arms, such that rotation of said two integral diametrically-opposed arms produces a corresponding rotation of said pair of bushings, while each said member is retained in attached rotatable relation with the ductwork to provide bearing support for said corresponding one of the two integral diametrically-opposed arms.

7. The damper unit according to claim 6, wherein a side of said tapered through-opening of lesser dimension of each member is of dimension less than a corresponding dimension of said corresponding one of the two integral diametrically-opposed arms to provide an airtight seal therebetween.

8. The damper unit according to claim 6, wherein said central body has a generally circular shape.

9. The damper unit according to claim 6, wherein said central body has a generally rectangular shape.

10. The damper unit according to claim 6, wherein said central body is generally square.

11. Ductwork for directing conditioned air in a predetermined direction, which comprises:
   A) at least a section of sheet metal ductwork having a generally tubular configuration and a generally circular cross-section; and
   B) a damper unit pivotally mounted to said section of ductwork, which comprises:
      i) a damper produced with the method of claim 1; and
      ii) a pair of bushings, each of which configured for pivotally mounting a corresponding one of said two integral diametrically-opposed arms to said section of ductwork, each of said pair of bushings including:
         a) a member made of a pliable silicone rubber material, and generally defining a longitudinal axis, said member having a first section of generally circular configuration monolithically formed with a second section of similar generally circular configuration, said first section having a first diameter greater than a second diameter of said second section to define an annular surface extending radially and about a periphery of said second section
         b) at least two diametrically opposed lips extending radially outwardly from said second section and adjacent to said first section, each one of said at least two diametrically opposed lips being longitudinally spaced from said annular surface of said first section;
         c) a groove which extends about the periphery of said second section adjacent said annular surface of said first section, a thickness of said groove in a longitudinal direction with respect to the longitudinal axis being sized and dimensioned to receive a thickness of sheet metal forming the ductwork, and an inner diameter of said groove being greater than a corresponding dimension of an aperture in the ductwork for resilient engaged reception of said member therein, wherein said member may be is securely attached to the ductwork by insertion of the member into the ductwork-aperture in the ductwork, and reception of the ductwork into said groove, wherein the ductwork is retained between said annular surface of said first section and said groove, and each of said at least two diametrically opposed lips of said second section; and
         d) a tapered through-opening extending generally centrally and longitudinally of said member, said through-opening being dimensioned for slidable engaged reception with a corresponding one of said two integral diametrically-opposed arms, said through-opening having a cross-sectional shape similar to the cross-sectional shape of said corresponding one of said two integral diametrically-opposed arms, such that rotation of said two integral diametrically-opposed arms produces a corresponding rotation of each said member, while each member is retained in attached rotatable relation with the ductwork to provide bearing support for said two integral diametrically-opposed arms, thereby providing an airtight seal therebetween.

12. The ductwork according to claim 11, wherein said central body of said damper has a generally circular shape.

13. The ductwork according to claim 11, wherein said central body of said damper has a generally rectangular shape.

14. The ductwork according to claim 11, wherein said central body of said damper is square.

* * * * *